United States Patent Office 3,423,906
Patented Jan. 28, 1969

3,423,906
APPARATUS FOR REMOVING PARTICLES FROM AIR
Robert A. Fried, Northbrook, Ill., assignor to F. W. Means & Co., Chicago, Ill., a corporation of Illinois
Filed Jan. 26, 1968, Ser. No. 700,777
U.S. Cl. 55—302
Int. Cl. B01d 46/04
5 Claims

ABSTRACT OF THE DISCLOSURE

An apparatus for filtering lint particles from air including a duct conveying air from a dryer to a filter screen; a storage chamber at one end of the filter screen to store lint trapped by the filter; and means to reverse air flow through the filter to release the lint particles trapped on the filter and transport them to the storage chamber, said apparatus having an air intake duct for the dryer passing along the air exit duct from the dryer to pre-heat the air introduced to the dryer.

---

The present invention relates to an improved apparatus for use with a fabric dryer and more specifically it relates to an air filter apparatus having means to remove lint and other solid particles from the air including means to pre-heat air introduced to the dryer.

Air filtering devices commonly employed in industrial installations, for example, involve moving lint carrying air through a screen whereby lint is trapped on the screen while the air passes through. However, as lint particles collect on the screen the passage of air therethrough becomes more difficult. The lint generally must be removed manually in some manner to permit continued free passage of air through the screen. For this reason the use of screen filters is not especially desirable.

Other filtering devices employed in industrial installations may involve relatively complex means for removal of solid particles from the dryer air. For example, a fluid screen filter may be used wherein the discharge air is passed through a spray to wet the solid particles in the air and cause them to drop out of the body of air.

The present invention is directed to the provision of an improved filter apparatus that employs the desirable economical mechanical screen filter means while at the same time providing means for freeing particles from the screen to permit continued free passage of air through the filter during use of the apparatus.

It is, accordingly, a general object of the present invention to provide an improved filter apparatus for use with fabric dryers.

Another object of the present invention resides in the provision of an improved filter apparatus having a mechanical screen filter for removal of solid particles from an air stream.

A further object of the present invention resides in the provision of an improved filter apparatus having means to pass the intake air along the air discharge duct of the apparatus to pre-heat the intake air to the dryer.

An additional object of the present invention resides in the provision of an improved filter apparatus for use with a fabric dryer wherein the particle-carrying air is passed along a duct into a chamber having walls defined by a screen thereby trapping the solid particles in the air on the screen while permitting the air to pass through to the discharge duct of the apparatus.

A further object of the present invention resides in the provision of an improved filter apparatus for use with a fabric dryer wherein the solid particles are removed from the air in one chamber and trapped therein for a part of the use cycle of the apparatus and wherein the solid particles are periodically removed from said one chamber and stored in a second chamber to free the filter screen of the first chamber for continuous use.

The invention itself is set forth with particularity in the appended claims. Further objects and advantages of the invention, however, will readily be understood from reading the following detailed description of the invention taken in connection with the drawings, in which:

FIGURE 3 is a side elevation, partly in section, of the filter apparatus of the present invention illustrating the chamber structure in greater detail.

Figure 1:
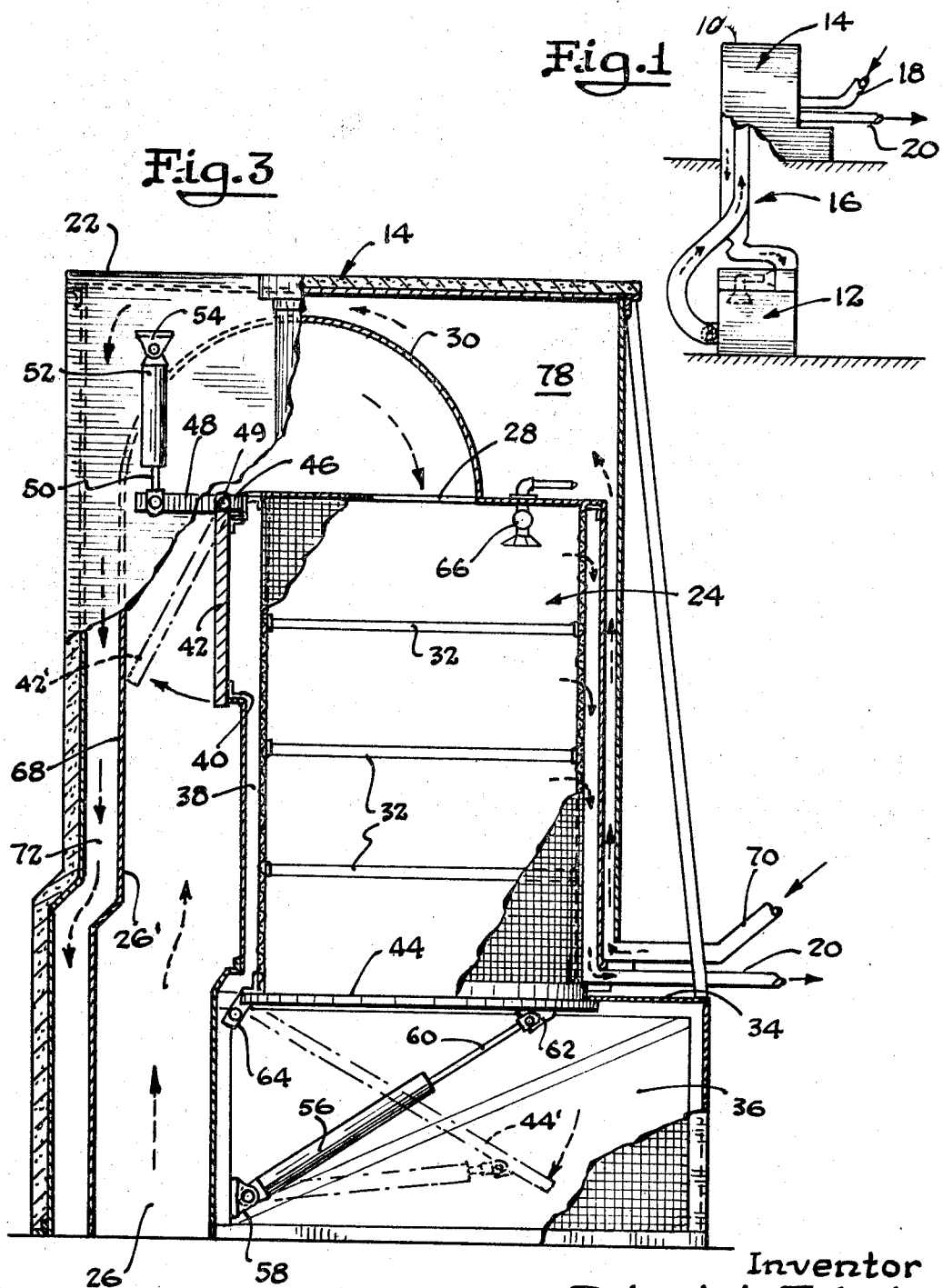
FIGURE 1 is a schematic representation of an installation using the invention set forth herein.

Referring more particularly now to the drawings, an installation in which the filter apparatus of the present invention may be employed is indicated generally at 10.

The installation 10, in part, includes a fabric dryer 12 and filter apparatus 14 interconnected by a duct 16 to bring the discharge air from the dryer 12 to the filter apparatus 14.

The filter apparatus 14 is provided with air intake and exhaust ducts 18 and 20, respectively. The apparatus is illustrated in greater detail in FIGURES 2 and 3 of the drawings and, as shown, includes a housing 22 extending about the primary filter chamber 24. A first air duct 26 is provided in the chamber and extends continuously from the duct 16 to the primary filter chamber 24. An opening 28 is provided in the top of the filter chamber 24 to permit air from the duct 26 to pass freely into said chamber.

Figure 2:
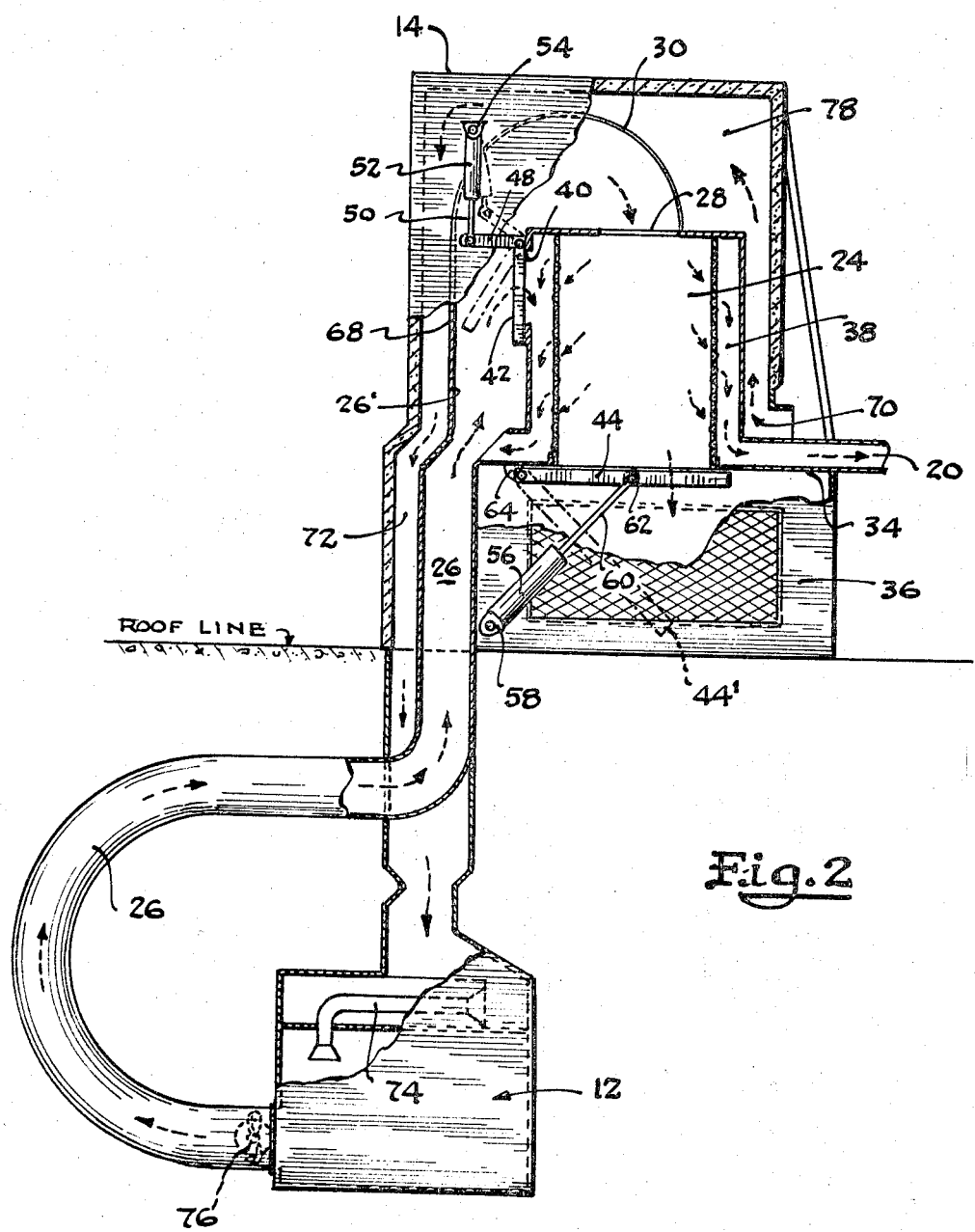
FIGURE 2 is a side elevation, partly in section, of the apparatus of the present invention illustrating the filter chamber, air intake duct, storage chamber and dryer connections.

The duct 26 reverses direction at the top 30 thereof as illustrated in FIGURE 2 of the drawings. This directional duct facilitates particle removal in the apparatus by reducing the velocity of the air and also reducing the ability of the moving body of air to maintain particles in suspension therein. Accordingly, some of the heavier particles in the moving body of air in duct 26 will drop out of suspension to the bottom of the chamber 24 upon introduction of air to the chamber immediately after the direction reversal in the duct 26.

The primary filter chamber 24 is defined by a screen wall supported on frame elements 32. The elements 32 are circular in the specific illustration set forth. However, the wall of the filter chamber may assume any convenient configuration.

The primary filter chamber 24 and frame assembly 32 are supported on the upper surface 34 of the storage chamber 36. The storage chamber defines a rigid support with the frame structure of the filter 14 and defines support means for the primary filter chamber 24.

An air conveying exhaust chamber 38 extends about the filter screen of the primary filter chamber 24 and conducts the air which passes through the screen of the primary filter chamber, to the air discharge or the exhaust 20 of the filter 14.

The air conveying chamber 38 is provided with a chamber opening 40 to define fluid access to the first air duct 26. The chamber opening 40 is provided with a closure member 42 which, in one position, extends continuously over the opening 40 to isolate the chamber 38 from the first air duct 26. In a second position, the closure member 42 is moved outwardly to the rear wall of the first air duct 26 to divert the air moving along said duct through the opening 40 and into the chamber 38. The air then is impressed against the screen of the filter 24 and forces any lint trapped on that filter screen to drop off onto the closure gate 44 at the bottom of the primary filter chamber 24.

The closure member 42 is pivotally secured to a support 46 adjacent the upper terminal of the opening 40. One end of an arm 48 is rigidly secured to the upper portion of the closure member 42 while the other end thereof is pivotally secured to the free end of a rod 50. The rod is associated with the piston of the hydraulic cylinder 52. The cylinder 52 is mounted on the support member 54 in a manner to permit the cylinder 52 to adapt to position changes required during opening and closing action of the closure member 42.

When the member 42 is opened, as indicated by the dashed lines 42' of FIGURE 2, the free end thereof rests fully against the back wall 26' of the first air duct 26 and extends fully across said duct to divert the air to the chamber 38.

A storage chamber 36 is defined below the primary filter chamber 24. The storage chamber 36 is a screened enclosure having the gate 44 disposed between the chamber 36 and the filter chamber 24. The gate 44 is retained in the closed position shown by the solid lines of FIGURE 3 by the hydraulic cylinder 56.

The cylinder 56 is pivotally mounted to the support member 58 to permit the cylinder to pivot as required during opening and closing movement of the gate 44. The rod 60 of the cylinder 56 is pivotally connected to the member 62 which, in turn, is secured to the gate 44. The gate 44 is hinged at one side on the elements 64.

A sprinkler 66 is provided in the primary filter chamber 24 as a safety feature in the event the lint collected in the chamber is ignited. The sprinkler 66 may be manually or automatically controlled.

The lint filter apparatus of the present invention is provided with a heat exchanger surface 68 extending along the back wall 26' of the first air duct 26 to define means for preheating the intake air from the dryer air intake 70 as it extends along the surface of the wall 26' through the dryer air intake duct 72 where it flows into the area of the gas burner 74 of the dryer 12.

The dryer 12 is provided with a blower 76 to move the air from the dryer along the air duct 26 to the lint collector 14. As the hot air moves along the first air duct 26 heat from the air is imparted to the wall of the duct. In this manner the back wall 26' of the duct 26 is heated to a level approaching a temperature of the air moving along the duct 26.

Operation of apparatus

In operation the materials to be dried are placed in the rotary dryer 12 through a conventional opening provided in the dryer (not shown). The dryer is operated to pass heated air about the materials for a predetermined period of time until excess moisture is removed from the materials and the materials are dried. At this time the materials are removed from the dryer and are available for subsequent processing.

The air from the dryer may pick up a substantial quantity of loose fibers and lint, or the like. This fiber or lint is carried along in suspension in the air as it passes from the dryer 12 into and along the first air duct 26 toward a filtering apparatus 14.

As noted above, the heated air from the dryer warms the wall 26' of the duct 26 as it passes along said duct. The air flows up along the duct 26 into the lint collector 14 and to the top of the duct 26, as shown at 30 in FIGURE 2, where a sharp reversal of direction of the air changes the velocity characteristic of the flowing air and initiates action which will cause the suspended particles in the body of flowing air to fall out of suspension in the air. The air flows from the top 30 of the duct 26 into the opening 28 of the primary filter chamber 24. The bottom of the primary filter chamber 24 is closed by the gate 44 and is defined by screen walls, as noted hereinabove.

The air passes into the primary filter chamber 24 and through the screen wall thereof to the air conveying exhaust chamber 38. As the air passes through the screen wall of the primary filter chamber the lint particles and fibers carried along in the body of air are trapped on the screen while the air passes through the screen and into the chamber 38. The air moves along the chamber 38 to the bottom thereof where an exhaust duct 28 passes the air to the atmosphere.

From time to time a substantial amount of lint and fabric will collect on the inner wall of the screen of the primary filter chamber 24. When substantial deposits of lint occur a significant impedance to the flow of air through the lint and the screen will be noted. Accordingly, it is necessary at determined intervals to remove the lint deposit on the inner wall of the screen of the filter chamber. In the past, this generally has been done manually. This is unsatisfactory since the chamber is relatively warm and access must be provided in some manner to permit manual removal of the lint. The present invention involves means for automatically removing the lint from the inner wall of the screen of the primary filter chamber 24 and discharging it into a storage chamber 36.

When the lint is to be removed from the wall of the filter chamber 24, the closure member 42 of the chamber 38 is moved to the position 42' illustrated in FIGURE 2 of the drawings. In this position the closure member 42' will divert the air flow from the first air duct 26, through the opening 40 in the wall of the chamber 38 to reverse the air flow through the screen of the primary filter chamber 24 as the air is impressed against the screen of the chamber 24 from the outside thereof to the inside of the chamber 24. The lint and fiber collected on the inner wall of the screen of the chamber 24 will be blown inwardly of the chamber and removed from attachment to the wall of the chamber to drop to the bottom thereof.

The gate 42 is opened by withdrawing the rod 50 into the cylinder 52 thereby rotating the arm 48 clockwise about the pivot 49, as shown in FIGURE 2. This will cause the gate 42 to rotate clockwise to the position of 42', as shown in FIGURE 2.

Operation of the piston-cylinder 52 may be accomplished simultaneously with operation of the piston-cylinder 56. When the cylinder 56 is operated in accordance with the air flow reversal noted above for transfer of air from the duct 26 directly to the chamber 38, the rod 60 will be withdrawn into the cylinder 56 and the gate 44 will be dropped downwardly to the position shown in FIGURE 2 at 44'. This will permit the lint removed from the walls of the screen of the primary filter chamber 24 to drop downwardly in the chamber 24 and into the storage chamber 36. The walls of the storage chamber 36 may be defined by a screen enclosure as noted above for the primary filter chamber 24. This will permit the exhaust air to pass through the screened walls of the chamber 36 to the atmosphere without impeding the flow of air through the apparatus. This flow reversal will occur for very brief periods during operation of the apparatus and will not result in deposit of any significant amounts of lint upon the outer wall of the screen 24. In any event, however, the lint which may be deposited upon the outer wall of the screen of the primary filter chamber 24 during this brief flow reversal period will be blown off the walls during the next normal operation in the operating sequence and will pass through the exhaust duct 20. A secondary, manually removable filter (not shown), may be interposed in the exhaust duct 20 to capture any lint or fibers passing along said duct. This filter may manually be replaced at any desired time interval.

When the full reversal period is completed the gate 44 is closed by extending the rod 60 of the cylinder 56 thereby defining a sealed bottom for the filter chamber 24. Likewise, the rod 50 is extended to move the gate 42 to the solid line position shown in FIGURE 2 to again seal the opening 40 of the chamber wall 38. This permits the air flowing along the duct 26 to again flow into the full reversal area 30 of said duct and through the opening 28 at the top of the filter chamber 24, into the filter chamber for normal operation.

To provide for efficient combustion and operation of the dryer it is desirable to preheat the dryer air in an economical manner so that dryer temperatures may be achieved with the burning of a minimum amount of the fuel to bring the air up to the desired temperature for removing moisture from the materials. In the apparatus of the present invention the air for the dryer is preheated in passage through the heat exchanger means of the lint collector 14. The dryer system is provided with an air intake 70 in the lint collector 14 of the apparatus. The air passes from the intake into the chamber 78 of the filter 14. In passing into the chamber 78 the air passes along the outer wall of the chamber 38 to initiate preheating of the dryer intake air. The air passes from the chamber 78 into the dryer air intake duct 72 and to the combustion area of the dryer 12. During passage of the air from the dryer intake 70 to the dryer 12 the intake air moves along the heated surface 68 of the duct 26. The cool air within the duct 72 is heated as it passes along the surface 68 to preheat the dryer intake air to the desired level. Accordingly, the apparatus of the present invention not only serves as a filter means for removing lint from the dryer air prior to exhausting the air to the atmosphere, but also permits preheating of the dryer intake air to permit optimum operation of the apparatus with a minimum amount of fuel.

What I claim as new and desire to secure by Letters Patent of the United States is:

1. An improved apparatus for removing particles from air comprising, in combination:
   a housing having an air discharge;
   a first air duct within said housing defining air conveying means therein, said duct having inlet and outlet terminals;
   porous filter means within the housing extending continuously from the outlet terminal of said first air duct and having a closure member at the bottom thereof;
   a filter chamber about the filter means and extending from the filter to the air discharge of the apparatus, said chamber having a closeable opening in the wall thereof;
   a closure member to seal said chamber opening in one position directing air into the filter means and to extend across the first air duct in a second position to direct air flow from said duct to the chamber through the chamber opening; and
   a storage chamber below said filter and selectively isolable from said filter means by the closure member of the filter means, whereby when said closure member extends across the first air duct and air flow is reversed through the filter to release the trapped particles, the closure member is opened to permit the particles to pass into the storage chamber.

2. The apparatus of claim 1 wherein the filter means is defined by a screen grid with openings large enough to freely permit the passage of air therethrough while trapping substantially all of the particles carried along in the body of air as it passes onto the screen grid to the exhaust.

3. The apparatus of claim 1 wherein the chamber about the filter means extends in relatively close spaced relation to the outer wall of the screen grid of the filter means and has an opening therein to the exhaust of the apparatus.

4. The apparatus of claim 3 wherein the opening of the chamber is at the bottom thereof and extends substantially about the bottom wall portion into a collector duct which carries the air to the exhaust.

5. The apparatus of claim 1 wherein the storage chamber is defined, in part, by a screen grid wall to permit the free passage of air through the walls to the exhaust while trapping the lint particles therein to be stored for subsequent removal.

References Cited

UNITED STATES PATENTS

| 2,084,408 | 6/1937 | Mueller | 34—82 |
| 3,011,205 | 12/1961 | Holtzclaw | 55—303 |
| 3,080,694 | 3/1963 | Smith | 55—293 |
| 3,188,680 | 6/1965 | Black | 55—302 |

FOREIGN PATENTS 676,922  8/1952  Great Britain.

HARRY B. THORNTON, *Primary Examiner.*

BERNARD NOYICK, *Assistant Examiner.*

U.S. Cl. X.R.

34—82; 55—432, 473